MAGNETIC MEMORY NOISE REDUCTION SYSTEM

Filed June 8, 1961 3 Sheets-Sheet 1

INVENTOR
DAVID J. CRAWFORD
BY
Roger S. Smith
ATTORNEY

June 22, 1965 D. J. CRAWFORD 3,191,163

MAGNETIC MEMORY NOISE REDUCTION SYSTEM

Filed June 8, 1961 3 Sheets-Sheet 3

3,191,163

MAGNETIC MEMORY NOISE REDUCTION SYSTEM

David J. Crawford, Poughkeepsie, N.Y., assignor to International Business Machines Corporation, New York, N.Y., a corporation of New York Filed June 8, 1961, Ser. No. 115,741
10 Claims. (Cl. 340—174)

The present invention relates generally to information storage systems, and more particularly to such systems which employ bistable magnetic storage elements.

During recent years memory systems employing bistable magnetic elements in matrix formation have enjoyed wide usage in data processing equipment. Systems of this type offer advantages in speed, reliability, ease of access, and power requirements which adapt them for use with modern high speed data processing machines. Among recent developments in the magnetic matrix memory art is what has been popularly termed the "two-core-per-bit" memory system. This system is fundamentally a word-organized matrix system which utilizes two magnetic memory cores for each data bit storage cell. The system comprises a coordinate array of cores functionally arranged in rows and columns, each column representing a different word storage register, and each pair of rows representing a different bit storage position common to all word registers. The two cores common to a given column and a given pair of rows form a bit storage register. To facilitate description two cores of each bit register are usually referred to as the A core and the B core. These cores are initially placed in identical magnetic states, for example the negative limiting state of remanent magnetism. Binary information is stored therein by switching one or both cores from the initial state toward the opposite limiting state of remanent magnetism, making sure that one of the two cores is switched farther than the other, so that their final information representing states contrast. For example, if a binary 1 is to be stored, the A core will be switched farther than the B core; if a binary 0 is to be stored, the B core will be switched farther than the A core.

To retrieve the stored information, both cores are returned to the initial state and the voltages induced by the consequent flux changes are combined so as to provide a signal which represents the difference between them. Since one core always experiences a greater flux change than the other in returning to the initial state, perfect cancellation of voltages does not occur, and a significant net difference signal is produced. The polarity of this signal indicates the value of the information stored.

It will be apparent to those skilled in the art that this two-core-per-bit system has many advantages over conventional memory systems which utilize only a single core per bit. Partial switching may be used to enhance speed, and to reduce power consumption and heating while retaining good reliability. Non-square hysteresis loop cores may be employed since information is represented by a difference in flux levels in two cores. Driving current tolerances may also be relaxed. Loading conditions for the drivers are improved since a constant load is presented to each driver regardless of the data values being stored or retrieved.

While the foregoing and other advantages are considerable, known two-core-per-bit systems suffer certain disadvantages with respect to conventional magnetic memory systems. Among the most serious is the problem of unwanted noise generation. In magnetic memory systems a cross-talk problem exists because of the proximity of the windings or coils which operate the system. In word-oriented systems such as the two-core-per-bit systems the cross-talk problem between bit entry windings and bit sense windings is particularly acute because both must extend in close juxtaposition throughout an entire row or pair of rows of cores. During information entry or "write-in" operations, relatively large signals are impressed upon the bit entry windings, and these induce corresponding signals in the adjacent sense windings through direct inductive and capacitive coupling. Additional noise is generated by the small flux changes produced in non-selected cores by the bit entry windings. This noise commonly called "delta noise" is a serious problem in large memories where each bit entry winding is common to a large number of cores. The sense amplifiers connected to the sense windings, being designed to receive relatively small output signals, are frequently overloaded by the unwanted noise signals. When this occurs, considerable "recovery" time must be allowed to permit the amplifiers to recover from these signals sufficiently to respond properly to the information output signals to be detected during readout. This recovery time lengthens the effective cycle time of the unit and is, consequently, undesirable. In systems where polarity sensing is not necessary, direct coupling may be avoided or reduced by employing twisted patterns for the sense winding. In systems where polarity sensing is not necessary, the delta noise may be effectively reduced or eliminated by reversing the polarity of the sense winding at intervals to provide self cancellation of delta noise signals.

The problem is not so simple in the case of two-core-per-bit systems, however, or for that matter, in any magnetic memory system where information is represented by the polarity of an output signal. Since a specific relationship must exist between the storage elements, their input windings and output windings, the use of noise cancelling sense patterns has not heretofore appeared possible.

According to the present invention, the problem of unwanted noise generation in the sense windings of a memory unit which employs polarity sensing is overcome by providing novel means for permitting the use of controlled noise cancelling sense winding patterns without attendant confusion of information output signals.

In accordance with this invention the information polarity reversals produced by a self cancelling sense pattern are compensated for by a novel system which inverts information associated with certain memory storage registers either as it is introduced for storage or as it is read out, thereby insuring that information inverted by the sense winding arrangement is reinverted and presented in proper order when passed on to the receiving circuitry after storage.

Accordingly, it is the primary object of this invention to provide means for eliminating unwanted noise in a memory system of the type wherein information values are represented by the polarity of information representing signals.

It is also an object of this invention to provide, in a memory wherein information values are represented by the polarity of information signals, means for making use of noise cancelling winding patterns without consequent confusion of information signal polarities.

It is also an object of the invention to provide a static magnetic memory which is faster and more reliable than prior art devices.

In the following detailed description of the invention, it is shown as embodied in a memory system of the two-core-per-bit type, to which it is particularly well adapted. It should be understood, however, that the teachings of this invention are equally applicable to any static magnetic memory system wherein polarity sensing is employed, and wherein noise of the type hereinbefore described is to be overcome, whether such system employs one core-per-bit, or more than that number.

The foregoing and other objects, features and advantages of the invention will be apparent from the following more particular description of preferred embodiments of the invention, as illustrated in the accompanying drawings.

In the drawings:

FIGURE 1a is a schematic illustration of an embodiment of a memory system employing the present invention;

FIGURE 1b is a chart showing the address code employed in the system of FIGURE 1a;

FIGURE 3 is a timing diagram illustrating the read, write and digit timing employed in the system of FIGURE 1a;

Figures 1A, 1B:
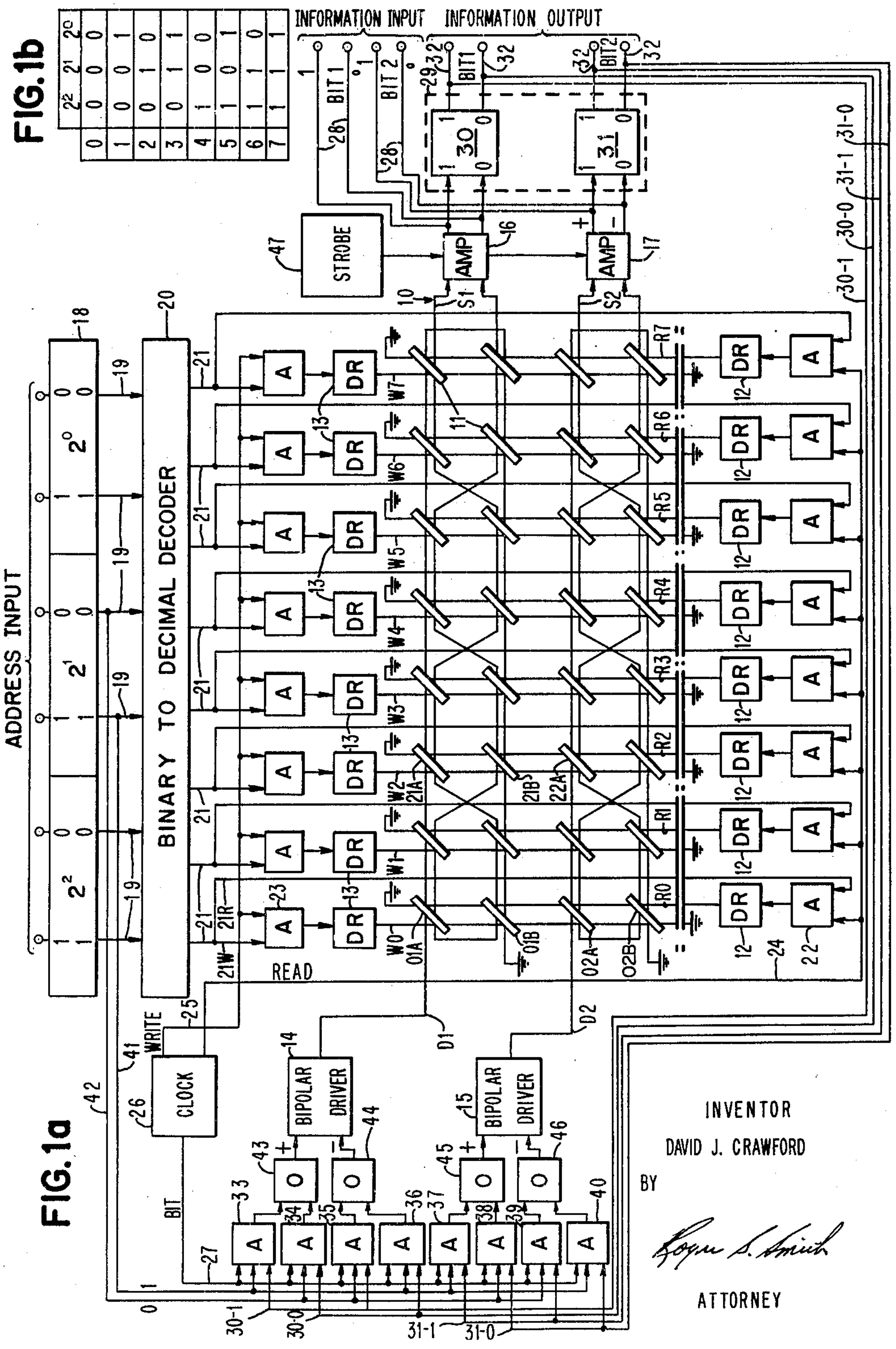

Referring now in detail to the drawings, there is shown in FIGURE 1a a two--core-per-bit memory system which embodies the present invention. The system includes a two dimensional, or word oriented matrix 10 of bistable magnetic cores, identified generally by the reference character 11. The cores 11 consist of toroidal bodies of suitable low coercive force ferromagnetic material exhibiting hysteresis characteristics similar to those shown in FIGURE 2 of the drawings. It will be observed from the curves of FIGURE 2, that the cores 11, while exhibiting substantial remanence, do not have the square loops and well defined knees found in cores employed in coventional memory systems.

The matrix 10 consists of eight columns, each of which corresponds to a different word storage register 0–7. The matrix includes two pairs of rows each of which pairs corresponds to a different bit position 1 or 2 common to all word registers. The matrix is thus capable of storing eight different two-bit words. It will be understood, of course, that a matrix of this limited capacity is shown only to simplify the description of the system, and that in actual practice, many more rows and columns are employed. A commercial system might include, for example, 128 columns and 72 pairs of rows.

A storage cell in the matrix 10 comprises two magnetic cores located at the intersection of one column and a pair of rows. The two cores, commonly identified core A and core B, are coupled by four windings; a read winding R which is serially connected to all cores of a single column of the matrix 10 in one sense; a write winding W which is also serially connected to all cores of a single column but in the opposite sense, a bit entry winding D which is coupled to all of the cores of a pair of rows of cores A and B, the sense of coupling to the row of cores A being opposite to the sense of coupling to the row of cores B; and finally a sense winding S which, like the bit winding couples all of the cores A and B of a pair of rows, the sense of coupling to the A cores being opposite to the sense of coupling to the B cores. For the sake of clarity, all similar windings in FIGURE 1a bear the same reference character R, W, D or S according to their functions, to which is added a number 1, 2, 3 etc. which indicates particular position of the windings in the matrix. For example, the read and write windings are labeled R0–R7 and W0–W7, respectively, to indicate the columns or word registers to which they are coupled. The bit and sense windings are labeled D1, D2 and S1, S2 to indicate the pairs of rows (or bit positions) to which they are coupled. The cores 11 of the matrix 10 also bear a reference character which serves to identify their location. The first digit of each reference character indicates the word register and the second indicates the bit position to which the core belongs. The letters A and B serve to distinguish the two cores of the same cell. The upper row in each pair contains the A cores of the associated storage cells while the lower row of the pair contains the B cores.

In the following description, any reference made to the cores by the general identification A or B, or to the windings by the general identification R, W, D or S should be considered as applicable to any such element in the matrix without regard to its location. Reference to a specific core or winding will be made by employing the complete reference character of the element concerned as, for example, the core 01A or the winding W1.

Figure 2:
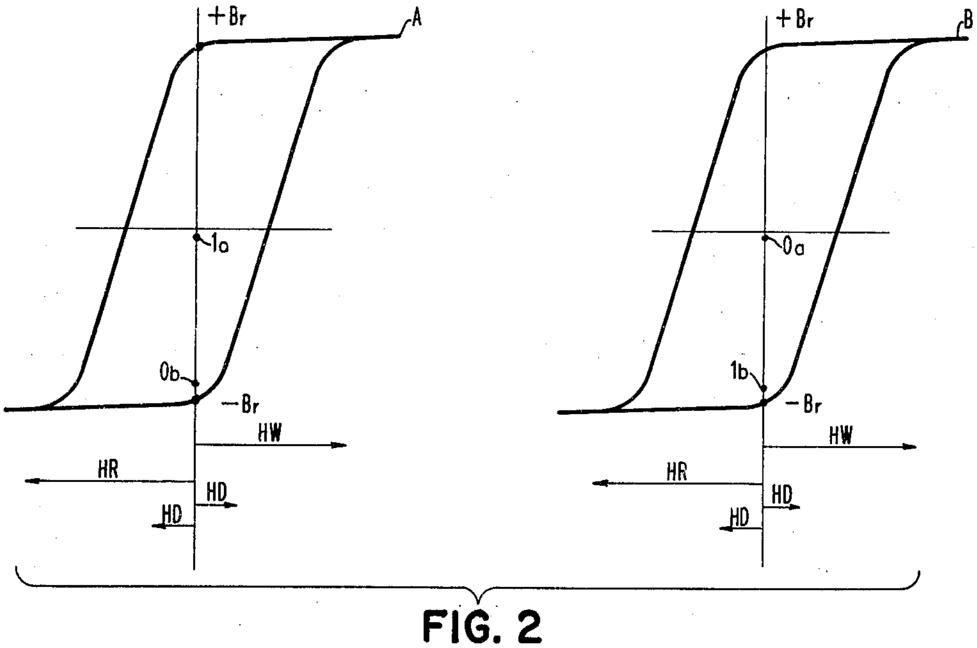
FIGURE 2 is a hysteresis diagram illustrating the operation of the memory of FIGURE 1.

As mentioned briefly earlier herein, information is stored in a cell of the matrix 10 by driving the two cores thereof from an initial or reset state toward the opposite state, in such a manner that one core switches farther from the initial state than the other. Referring to FIGURE 2, there are shown typical hysteresis loops for the two cores A and B of a cell of the matrix 10. Each of the cores A and B is initially established at or near its negative limiting remanence state −Br by application thereto of a magnetizing field HR sufficient in magnitude and duration to switch it from any previously held point to point −Br. This field HR is established by activation of the read winding R coupling the cores.

Information is entered into the cores A and B by simultaneous application of magnetizing fields HW and HD via the word and digit windings W and D respectively. The write field HW is applied to both cores in the same direction and is of magnitude and duration sufficient to switch both part way from the negative remanence point −Br toward the positive remanence point +B*r*. The force HW may be well in excess of the static coercive force of the cores to produce rapid flux changes, but is of too short duration to produce complete reversal of magnetization. The bit field HD is applied to the two cores in opposite directions, so that it aids the field HW in one core and opposes it in the other. The magnitude of the bit field may be quite small compared to that of the write field and is kept well below the switching threshold of the cores to minimize delta effects in unselected cores. The arrows HR, HW and HD in FIGURE 2 are intended only to indicate the directions of the various fields and do not accurately indicate their respective strengths.

If a binary 1 is to be entered in a storage cell, the bit winding D is activated to provide bit current flowing in a direction to produce a bit field which aids the write field in core A and opposes it in core B. Core A is accordingly switched to an intermediate remanence state 1*a* and core B is switched to an intermediate remanence state 1*b*. Since core A experienced a higher net field than core B state 1*a* is significantly farther from the reset state than is state 1*b*.

If a binary 0 is to be written in the cell, the bit winding D is activated in the opposite direction to produce a bit field which opposes the write field in core A and aids it in core B, setting the cores to states 0*a* and 0*b* respectively.

Upon readout, both cores of the cell are returned to the reset state −B*r*, by activation of the associated read winding R. Since one core switches more flux than the other in returning to the reset state, it will produce a larger output signal. The signals are differenced by the sense winding S and a net difference output is produced. The polarity of the net output signal depends upon which core A or B provided the largest output and, therefore, the polarity of the net output signal represents the binary value read from the cell.

Referring again to FIGURE 1*a*, it will be seen that each of the word oriented read windings R0–R7 is connected between a driver 12 and reference potential, as indicated by the conventional symbol. The write windings W0–W7 are similarly connected between write drivers 13 and reference potential. The read and write drivers 12 and 13 are circuits capable of supplying unidirectional current of amplitudes sufficient, when passed through the windings R and W, to produce the fields HR and HW hereinbefore described. Drivers or pulse generators of this type are well known in the art so the details thereof will not be described.

The bit windings D0 and D1 are connected between reference potential and digit drivers 14 and 15, each of which is capable of producing current of amplitude sufficient, when passed through the associated digit winding, to produce the field HD hereinbefore described. The drivers 14 and 15 are bipolar, that is to say, capable of producing current in either of two opposite directions. Accordingly, each driver 14 and 15 is shown as having two inputs labeled "+" and "—" for controlling the polarity of operation. Bipolar drivers are known in the art so it is not believed necessary to disclose the details of a driver 14 or 15 herein.

The sense windings S1 and S2 are coupled to sense amplifiers 16 and 17 of the type capable of amplifying signals of either polarity. The amplifiers 16 and 17 are shown with two outputs "+" and "—" for transmitting the amplified signals. Depending upon the polarity of the net difference signal applied to an amplifier 16 or 17 one or the other of its outputs will produce a signal. As in the case of the drivers and for the same reason no detailed description of the amplifiers 16 and 17 is included herein.

The selection of a word register to be read or written into is accomplished by supplying to the system an "address word" which identifies the register to be activated. Depending upon the size of the memory and the type of coding employed, this word may take any of several forms. In the embodiment of FIGURE 1*a* a three-order pure binary address is employed. This address is supplied by means not shown to an address register 18. The register 18 consists of three triggers or flip-flops, each associated with one order of the address word. Each trigger of register 18 has two output lines, one of which is energized when the trigger is set to the binary 1 state and the other of which is energized when the trigger is set to the binary 0 state. These output lines, collectively identified by the number 19, provide inputs to a binary-to-decimal decoder network 20. The network 20, which may be a tree circuit, a diode matrix, or any other known decoder, converts the binary address to 1 out of 8 decimal addresses and energizes a corresponding one of the eight output lines 21 extending therefrom. The conversion performed by the decoder 20 is shown in the chart of FIGURE 1*b*.

Figure 3:
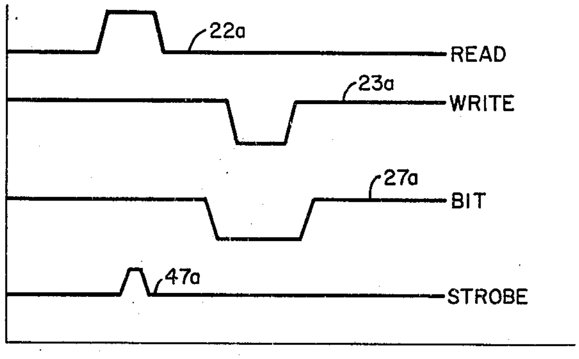

Each of the eight outputs 21 of the decoder 20 is connected to a different one of the read drivers 12 through a line 21*r* and to the corresponding write driver through a line 21*w*. Read gates 22 and write gates 23 are interposed in the lines 21*r* and 21*w*. Gates 22 and 23 are primed by timing pulses 22*a* and 23*a* (FIGURE 3) supplied via read timing line 24 and write timing line 25 from a timing or clock circuit 26. Circuit 26 controls the inception and duration of the pulses supplied by the drivers 12 and 13. It also controls the operation of the bit drivers 14 and 15 through line 27, as will be made clear later herein.

Information to be stored in the matrix 10 is entered by bit entry lines, collectively indicated at 28, into a data entry and exit register 29, which, like the register 18, consists of a separate trigger or flip flop for each bit of the data word to be stored. The triggers are individually identified as 30 and 31 in FIGURE 1*a*. Each of the triggers 30 and 31 has two inputs and two outputs. The upper input line sets the trigger to the 1 state when energized and the lower line sets it to the 0 state. The upper output line is energized when the trigger is in the 1 state and the lower output is energized when it is in the 0 state. The output lines of trigger 30 are identified in FIGURE 1*a* as 30–1 and 30–0. Those of trigger 31 are correspondingly identified as 31–1 and 31–0. These several output lines are coupled through means described later herein to the bit drivers 14 and 15 to control storage of new information and regeneration of read-out information into the matrix 10. The lines 30–1, 30–0, 31–1 and 31–0 are also coupled to data output terminals, collectively identified at 32, through which information is exited from the storage system to a receiving device, for example, a digital computer.

Figure 4:
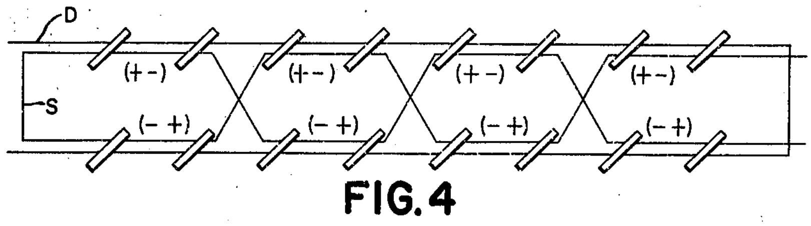
FIGURE 4 is a schematic drawing illustrating the noise cancellation effects of the sense winding pattern employed by this invention.

As described earlier, a serious noise problem exists in conventional two-core-per-bit memories because of direct coupling between bit and sense lines during write time and because of the cumulative effects of delta noise induced in the sense lines by unselected cores disturbed by the bit currents. According to this invention this noise is avoided by reversing each sense winding loop at equidistantly spaced points along each pair of rows as shown in FIGURE 1*a*. The sense lines thus arranged may be considered as made up of a plurality of segments each passing through two cores of a row. The segments are serially connected so that segments of each row are alternated with segments of the outer row. This pattern produces a polarity reversal of half the segments of a row with respect to the other half, as may be demonstrated by tracing a sense winding from one terminal of its associated amplifier to the other. This arrangement provides substantially complete cancellation of noise generated in the sense windings through direct coupling thereof with the associated bit windings, as demonstrated in FIGURE 4, which schematically shows the relation of directly coupled signals in a winding S. Referring to FIGURE 4, consider that the winding D is activated to produce noise signals (+—) in each segment of the upper half of winding S and signals (—+) in each segment of the lower half. It will be noted that the signals in the sections which are adjacent in the series connection of segments are of opposite polarity and will cancel each other.

FIGURE 4 also demonstrates that the sense winding pattern shown also provides cancellation of delta noise. Consider that upon activation of the winding D, each core 11 is disturbed slightly to induce a voltage in the winding S. Since all cores 11 of the upper row are coupled in the same sense, each such induced voltage will be of the same polarity in its associated sense segment. These voltages may, then, be represented by the symbols (+—). Since all cores of the lower row are coupled in the opposite sense, the voltages induced therein may be represented by the symbols (—+). As pointed out above, the arrangement of winding S is such that these signals are self cancelling.

The arrangement of the sense windings S1 and S2 has another effect, in addition to the self cancelling effects just described. As may be seen in FIGURE 1*a*, the sense windings S1 and S2 couple the two cores of each storage cell in such a manner that the signals induced therein oppose one another when the cores are switched from their information holding states to the reset state. While the reversals or criss-crosses in the sense windings do not affect the relationship between the two cores of a cell (they still are coupled in opposition) these reversals do affect the relationship between the cores of the cells in adjacent segments of the sense loop. When the sense loop is reversed a polarity change in the net difference voltage provided by the cores coupled thereto is also reversed. Thus, in the embodiment of FIGURE 1*a*, if cores 01A and 01B are set so that core 01A is "high" (farther from the reset state than core 01B) the net difference signal induced in the sense line S1 upon readout will be negative at the upper terminal of the amplifier 16 connected thereto. However, if cores 21A and 21B are set in the same manner, i.e., core 21A high, the net difference signal induced in winding S1 upon readout will be positive at the upper terminal. The sense winding pattern has thus inverted the signals produced by cells in columns 0 and 1 and columns 4 and 5 so that if information is stored in these columns in the normal manner, binary 1's will appear as binary 0's when read out, and vice versa.

According to this invention, means are provided for accommodating this inversion without confusion of information values. This is accomplished by reinverting all information associated with the storage cells wherein inversion takes place. In the embodiment of FIGURE *1a*, this inversion is accomplished as information is read into the cells so that whereas a 1 is read into a cell of any of columns 0, 1, 4 or 5 by switching the B core higher than the A core, a 1 is read into a cell of any of columns 2, 3, 6 or 7 by switching the A core higher than the B core. Upon readout the inversion produced in the sense winding in columns 0, 1, 4 and 5 presents the information read therefrom to the sense amplifiers 16 and 17 in the same form as information read from the other columns.

The inverting means appear at the left of bit drivers 14 and 15 in FIGURE *1a*. For each bit driver there is provided a set of four AND gates numbered 33–36 and 37–40 respectively. Each of these gates has three separate inputs, all of which must be activated coincidentally to produce an output from the gate. One input for each gate 33–40 is supplied by a bit timing pulse 27*a* on the bit timing line 27. A second input for each of gates 33, 36, 37 and 40 is supplied by a line 41 which connects to the 1 output of the $2^1$ order trigger of address register 18. The second input of the remaining gate 34, 35, 38 and 39 is supplied by a line 42 which connects to the 0 output of the $2^1$ trigger of register 18. The third input of gates 33 and 35 is supplied by data input line 30–1. The third input for gates 34 and 36 is supplied by data input 30–0. The third inputs for gates 37 and 39 and for gates 38 and 40 are respectively applied by data input lines 31–1 and 31–0.

The outputs of gates 33 and 34 are coupled through OR circuit 43 to the "+" control input of driver 14. The outputs of gates 35 and 36 are coupled through OR circuit 44 to the "—" control input of the same driver. OR circuits 45 and 46 couple the output of gates 37 and 38 and gates 39 and 40 respectively to the "+" and "—" control input of digit driver 15.

It will be apparent that the inverting arrangement just described will activate each of the drivers 14 and 15 in one polarity or the other for a given bit value in dependence upon the values stored in the $2^1$ triggers of register 18. It will also be apparent, from inspection of the chart of FIGURE *1b* that the value of the $2^1$ digit of the binary address word determines whether the addressed word storage register is one of columns 0. 1, 4 and 5 or one of columns 2, 3, 6 and 7. If the value of the $2^1$ position of the address word is 0, the data being stored must be inverted, whereas if it is a 1, the inversion is not required.

Consider, for example, that the data word "10" is to be stored in the storage register corresponding to addresses "000." The following events take place: Address "000" is loaded into register 18 activating those output lines 19 which correspond to the 0 outputs of the address register triggers. These outputs activate decoder 20 to produce signals on the lines 21*w* and 21*r* which couple the read and write drivers 12 and 13 of columne 1. When the clock 26 produces a read timing signal (line 22*a*—FIGURE 3) on line 24 to prime the gate 22 associated with read winding R–0, the driver 12 is activated to send current through line R–0. This resets cores 01A, 01B, 02A and 02B to point —Br, reading out any previously stored information to amplifiers 16 and 17. Since the purpose of the memory cycle under consideration is to store new information, amplifiers 16 and 17 are not sampled by the strobe means 47 and no outputs are provided thereby.

While word register 1 is being readied for storage, the new data word to be entered is loaded into data register 29 via lines 28. Trigger 30 is set to the 1 state activating line 30–1 and trigger 31 is set to the 0 state, activating line 31–0. The signal on line 30–1 is applied to each of the AND gates 33 and 35, while the signal on line 31–0 is applied to gates 38 and 40. The second input of each of gates 33 and 40 is supplied by line 42, activated by the 0 output of the $2^1$ trigger of address register 18. Since line 41 is not energized, gates 33 and 40 are disabled. When the clock 26 primes gates 35 and 38 with the bit timing signal (line 27*a*—FIGURE 3) via bit timing line 27, a signal is applied through OR circuit 44 to activate bit driver 14 in the negative sense, and a signal is applied through or circuit 45 to activate digit driver 15 in the positive sense. At the same time the write timing signal (line 23*a*—FIGURE 3) on line 25 gates the decoded address signal to the driver 13 of write line W–0. A binary 1 is entered in cores 01A and 01B by switching core 01A "low" and core 01B "high." A binary 0 is entered in cores 02A and 02B by switching core 02A "high" and core 02B "low." The bit pulses on lines D1 and D2 do not alter information in any of the remaining cores in the matrix 10 since none of the column windings W1 to W7 or R1 to R7 are activated. As pointed out earlier herein, the noise produced by these digit pulses is cancelled in the sense windings S1 and S2.

Upon readout of the information just stored, the sense winding S1 will experience a net voltage positive at the upper terminal while winding S2 will experience a voltage negative at the upper terminal. This occurs since sense lines S1 and S2 couple the cores of column 0 in reverse polarity. These voltages, amplified by amplifiers 16 and 17, are gated by a pulse line 47*a* (FIGURE 3) from strobe circuit 47 to triggers 30 and 31 to set them to the 1 and 0 states respectively.

If in the foregoing example, the word storage register being addressed had been one of registers 2, 3, 6 or 7, for example register 6, then control line 41 would have been activated instead of line 42. In this event, AND gates 33 and 40 would have been enabled instead of gates 35 and 38 and drivers 14 and 15 would have been energized in the opposite senses. A binary 1 would have been entered in cores 61A and 61B by switching core 61A high and 61B low and a 0 would have been entered in cores 62A and 62B by switching core 62A low and core 62B high. Since register 6 is one which is coupled to its sense lines in normal polarity, the data read out when cores 61A, 61B and 62A and 62B are reset will produce a voltage in line S1 positive at the upper terminal and in line S2 negative at the upper terminal. When amplified and gated out, these voltages will set triggers 30 and 31 to the 1 and 0 states respectively, as in the example just described.

Figure 5:
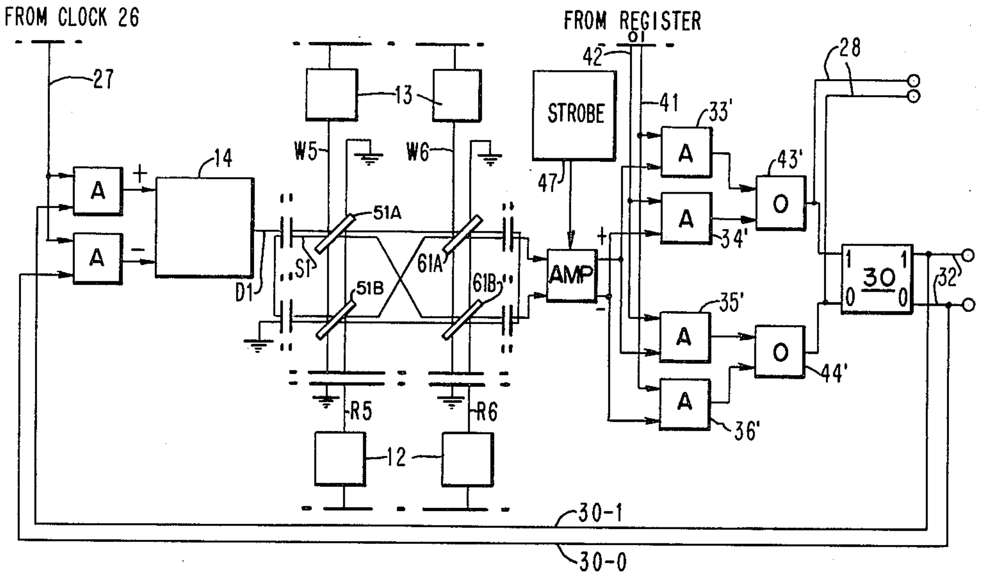
FIGURE 5 is a fragmentary schematic illustration of a memory system embodying a modified form of the invention.

The system shown in FIGURE 1 employs means for inverting information relating to certain memory addresses at the time the information is stored. It will be apparent to those skilled in the art that the required information inversion can as well be accomplished when the information, stored in a normal manner, is read out. The fragmentary schematic illustration of FIGURE 5 demonstrates this modification. In FIGURE 5 there is shown in part a memory matrix similar to that of FIGURE *1a*. For the sake of clarity, the elements of FIGURE 5 which correspond to those of FIGURE *1a* bear identical reference characters. It will be recalled from the description of FIGURE *1a* that due to the winding pattern of line S1 information stored in ward register 6 will appear at the sense amplifier 16 in proper form while information stored in word register 5 will appear in inverted form. In this embodiment of the invention, no means are provided to pre-invert the information to be entered in storage register 5. Data entry lines 30-1 and 30-0 are coupled to bit driver 14 so that a binary 1 always activates driver 14 in the positive sense and a binary 0 always activates it in a negative sense. A binary 1, then, is stored in cores 51A and 51B or in cores 61A and 61B by setting the A core high and setting the B core low. Upon readout, the binary 1 stored in cores 61A and 61B will appear as a voltage positive at the upper terminal of amplifier 16 while the same information read from cores 51A and 51B will appear as a voltage negative at the upper terminal of amplifier 16. The inverting circuitry including the two-input AND gates 33′–36′ functions to pass information read from storage register 6 (and registers 2, 3, and 7 as well) in normal form, but to invert information read from register 5 (and registers 0, 1 and 4 as well). The gates 33′–36′ are controlled by lines 41 and 42 in the same manner as in FIGURE 1. If line 41 is energized, indicating that one of registers 2, 3, 6 or 7 is being addressed, gates 33′ and 36′ are opened to pass a positive output from amplifier 16 to the binary 1 input of data register trigger 30 or to pass a negative output from amplifier 16 to the binary 0 input of trigger 30. If line 42 is energized indicating that one of registers 0, 1, 4 or 5 is being addressed, gates 34′ and 35′ are opened to pass a negative output from amplifier 16 to the binary 1 input of trigger 30 or to pass a positive output from amplifier 16 to the binary 0 input of trigger 30.

Figure 6:
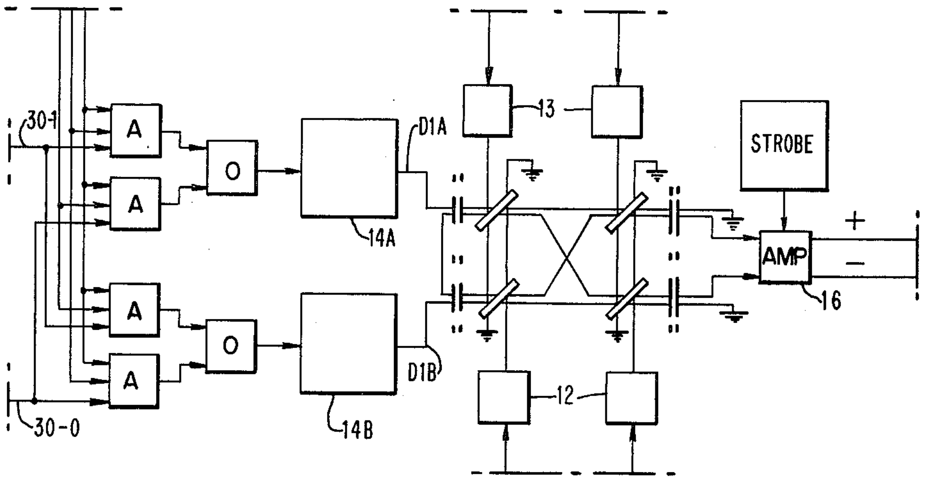
FIGURE 6 is a fragmentary schematic illustration of another embodiment of the invention which employs a memory matrix having a modified digit driving system.

FIGURE 6 illustrates another embodiment of the invention wherein a two-core-per-bit memory system using unipolar bit drivers is employed. Except for the modification of the bit drive system as described below, this system may be constructed and operated in the same manner as the system of FIGURE 1. In this embodiment each row of a pair is provided with a separate bit winding D1A or D1B rather than a common winding as shown in FIGURES 1*a* and 5. Two unipolar bit drivers 14A and 14B couple the windings D1A and D1B as shown in FIGURE 6. One or the other of these drivers is energized to enter information into a storage cell. For example, if a binary 1 is to be entered, the driver 14A may be energized to pass current through winding D1A coincidentally with passage of current through the write winding W of the selected cell. The A core of the cell will experience the additive effects of the write field and the bit field and will be switched high. The B core will experience only the affect of the write field and will be switched low. If a 0 is to be entered, the driver D1B may be energized to drive the B core of the selected cell high and the A core low.

It will be appreciated that this memory system suffers from the same noise problems as the system of FIGURES 1*a* and 5. The solution of the problem is identical. A twisted winding pattern is employed for sense winding S1 as in FIGURES 1*a* and 5, and an information inverting system 33–36, operating under control of the address lines 41 and 42 is employed to pre-invert information to be stored in the cells coupled to the sense winding in reverse polarity. The only difference between this system and that of FIGURE 1*a* is that the outputs of OR circuits 43 and 44 connect to the individual inputs of drivers 14A and 14B, respectively, rather than to the "+" and "—" inputs of a single bipolar driver 14.

It will be readily understood that a system for inverting the output of sense amplifier 16 as in FIGURE 5 may be used with the system of FIGURE 6 instead of the pre-inverting means shown, if desired.

It should be apparent from the foregoing that this invention provides a simple and reliable means for eliminating unwanted noise in a two-core-per-bit memory system. While not specifically shown, it will be understood that the teachings hereof are also applicable to other static magnetic memory systems, for example, one-core-per-bit systems or systems employing multipath elements which utilize output polarities to represent information values.

While the invention has been particularly shown and described with references to preferred embodiments thereof, it will be understood by those skilled in the art that various changes in form and details may be made therein without departing from the spirit and scope of the invention.

What is claimed is:

1. In a memory system which includes a plurality of bistable magnetic elements functionally arrayed in a matrix of rows and columns, means including row and column coils for affecting the states of said elements to store information in and read information from said matrix, a plurality of sense windings each coupling all of the elements of at least one row of elements, and means responsive to the respective polarity of information signals induced in said sense windings during reading for detecting information values, the improvement in means for reducing noise signals in said sense windings comprising for each row, means for dividing the sense winding for that row into a plurality of segments each coupling only a portion of the elements in that row and serially connecting adjacent segments in series opposition, whereby to provide for cancellation of noise signals induced in adjacent segments, and means for providing polarity inversion for elements coupled to alternate ones of said segments with respect to information stored in elements coupled to the remaining segments of said sense winding.

2. The invention defined in claim 1 wherein said means for providing polarity inversion comprises means for inverting the polarity of output signals from the elements coupled to said alternate ones of said segments.

3. The invention defined in claim 1 wherein said means for providing polarity inversion comprises means for inverting information entered in the elements coupled to said alternate ones of said segments.

4. In a memory system, a matrix of bistable magnetic cores arrayed in columns and pairs of rows, the two cores common to one column and one pair of rows representing a digit storage cell, said two cores having a first combination of stable states representing a reset condition and having second and third distinctly different combinations of stable states representing stored binary information, a plurality of separate write-in windings each coupling all of the cores of a different column, a plurality of separate digit entry windings means each coupling all of the cores of a different pair of rows, means for coincidently exciting a selected one of said write-in windings to select a column of cells for entry of information, means for exciting each of said digit entry winding means coincidently with said selected write-in winding to establish the cores of each of those cells in the column coupled by said selected write-in winding in one of said second or third combinations of states to store binary information, means for establishing the cores of each cell in a selected column in their first combination of states to read out information stored therein, and sense means for each pair of rows for detecting upon read out the value of information read from the cell common to that pair of rows and the selected column, each said sense means comprising a plurality of sense winding segments each coupling a portion of the cores of one of the rows of a pair, the said segments of each sense means together coupling all of the cores in a pair of rows, circuit means connecting the said segments so that voltages induced therein by the cores of a cell are differenced to produce a net difference signal upon read-out of the cell, the polarity of which difference signal indicates the value of information read from said cell, said circuit means interconnecting said segments so that noise signals induced in segments coupled to cores of some cells of a pair of rows oppose noise signals induced in segments coupled to cores of other cells of a pair of rows, and means for providing inversion for cells coupled to certain of said segments.

5. The invention defined in claim 4 wherein said means for providing inversion comprises means for reversing the polarity of the net difference signal upon readout of any cell coupled to said certain segments.

6. The invention defined in claim 4 wherein said means for providing inversion comprises means for controlling the digit entry winding means to enter information of one predetermined value in cells coupled to said certain segments by establishing the cores thereof in a predetermined one of the second or third combinations of states and to enter information of said one predetermined value in cells coupled to other segments by establishing the cores thereof in the other of said second or third combinations of states.

7. In a memory system, a matrix of bistable magnetic cores arrayed in columns and pairs of rows, the two cores common to one column and one pair of rows representing a digit storage cell, said two cores having a first combination of stable states representing a reset condition and having second and third distinctly different combinations of stable states representing stored binary information, a plurality of separate write-in windings each coupling all of the cores of a different column, a plurality of separate digit entry winding means each coupling all of the cores of a different pair of rows, means for coincidently exciting a selected one of said write-in windings to select a column of cells for entry of information, means for exciting each of said digit entry winding means in a sense dependent upon the value of information to be stored coincidently with and selected write-in winding to establish the cores of each of those cells in the column coupled by said selected write-in winding in one of said second or third combinations of states to store binary information, means for establishing the cores of each cell in a selected column in their first combination of states to read out information stored therein, sense means for each pair of rows for detecting upon read out the value of information read from the cell common to that pair of rows and the selected column, and information receiving means coupled to said sense means, each said sense means comprising a plurality of sense winding segments each coupling a portion of the cores of one of the rows of a pair, the said segments of each sense means together coupling all of the cores in a pair of rows, circuit means serially connecting the said segments so that voltages induced therein by the cores of a cell are differenced to produce a net difference signal upon read-out of the cell the polarity of which difference signal indicates the value of information read from said cell, said circuit means interconnecting adjacent segments in the same row in series opposition so that noise signals induced in alternathe segments of a row oppose noise signals induced in the remaining segments of a row, and means for providing inversion for cells coupled to said alternate segments.

8. The invention defined in claim 7 wherein said means for providing inversion comprises means responsive to selection for read out of a column containing cells coupled to one of said alternate segments for inverting the polarity of coupling of each said sense means to the information receiving means.

9. The invention defined in claim 7 wherein said means for providing inversion comprises means responsive to selection of a write-in winding coupling a column containing cells coupled to said alternate segments for reversing the sense of excitation of each of the digit entry winding means.

10. In a memory system, a matrix of bistable magnetic cores arrayed in columns and pairs of rows, the two cores common to one column and one pair of rows representing a digit storage cell, said two cores having a first combination of stable states representing a reset condition and having second and third distinctly different combinations of stable states representing stored binary information, a plurality of separate write-in windings each coupling all of the cores of a different column, a plurality of separate digit entry windings each coupling all of the cores of a different row, means for coincidently exciting a selected one of said write-in windings to select a column of cells for entry of information, information value responsive means for each pair of rows for exciting one only of the two digit entry windings connected to the rows of that pair coincidently with excitation of said selected write-in winding to establish the cores of each of those cells common to the column coupled by said selected write-in winding in one of said second or third combinations of states to store binary information, means for establishing the cores of each cell in a selected column in their first combination of states to read out information stored therein, and sense means for each pair of rows for detecting upon read out the value of information read from the cell common to that pair of rows and the selected column, each said sense means comprising a plurality of sense winding segments each coupling a portion of the cores of one of the rows of a pair, the said segments of each sense means together coupling all of the cores in a pair of rows, circuit means serially connecting the segments of each pair of rows so that voltages induced therein by the cores of a cell are differenced to produce a net difference signal upon read-out of the cell the polarity of which difference signal indicates the value of information read from said cell, said circuit means interconnecting adjacent segments in the same row in opposition so that noise signals induced in alternate segments of a row oppose noise signals induced in the remaining segments of the row, and means responsive to selection of a write-in winding coupling cells coupled by said alternate sense winding segments for reversing the connection of each of the information value responsive means to the associated two digit windings, whereby information is storable in cells coupled to said alternate segments in inverted form.

No references cited.

IRVING L. SRAGOW, *Primary Examiner.*